United States Patent [19]

Doan

[11] 3,822,481
[45] July 9, 1974

[54] PIPE FLANGE ALIGNER

[76] Inventor: Robert L. Doan, 10362 Vic Pl., Garden Grove, Calif. 92642

[22] Filed: June 1, 1973

[21] Appl. No.: 365,845

[52] U.S. Cl. ............................................. 33/371
[51] Int. Cl. ............................................. G01c 9/28
[58] Field of Search ............. 33/347, 370, 371, 372, 33/373, 387, 180 R, 181 R, 185 R; 403/289, 290, 354

[56] References Cited
UNITED STATES PATENTS

| | | | |
|---|---|---|---|
| 2,323,039 | 6/1943 | Hill | 33/371 X |
| 2,531,799 | 11/1950 | Zumwalt | 33/370 X |
| 2,602,672 | 7/1952 | Weard | 403/354 |
| 2,746,163 | 5/1956 | Moritz | 33/370 |
| 3,762,068 | 10/1973 | Clay | 33/372 |
| R19,810 | 1/1936 | Meusy | 403/289 |

Primary Examiner—Louis R. Prince
Assistant Examiner—Charles E. Phillips
Attorney, Agent, or Firm—Philip M. Hinderstein

[57] ABSTRACT

Apparatus for vertically leveling the face and horizontally aligning the pairs of holes of a pipe flange comprising a pair of self-aligning line-up pins engagable with the respective holes of one of the pairs of holes in the pipe flange, the pins aligning themselves with the axes of the holes; an elongated bar extending perpendicularly through the line-up pins for interconnecting and maintaining the pins in parallel, spaced-apart relationship with the line-up pins being movable relative to the bar, toward and away from each other; a first bubble level mounted on one of the line-up pins for vertically leveling the face of the pipe flange; and a second bubble level mounted on the bar for horizontally leveling the holes of the one pair of holes.

3 Claims, 5 Drawing Figures

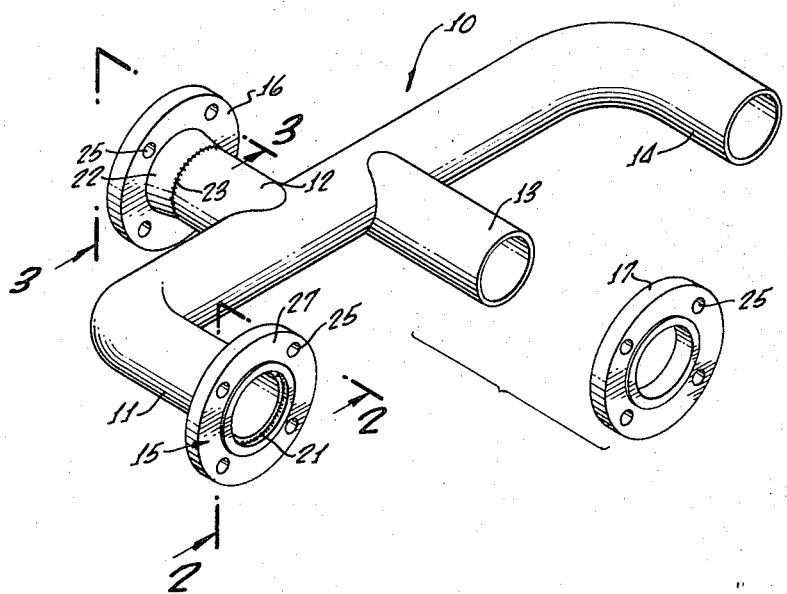
Fig. 1.
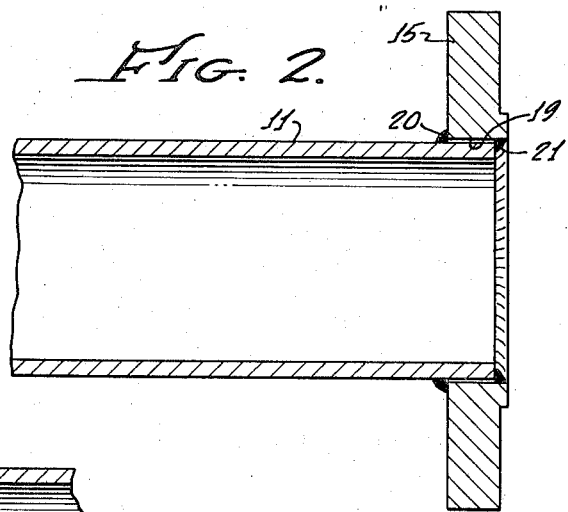
Fig. 2.
Fig. 3.

PATENTED JUL 9 1974 3,822,481

PIPE FLANGE ALIGNER

BACKGROUND OF THE INVENTION

1. Field of the Invention.

The present invention relates to a pipe flange aligner and, more particularly, to apparatus for vertically leveling the face and horizontally aligning the pairs of holes of a pipe flange.

2. Description of the Prior Art.

In many fluid handling industries, various types of fluids are conducted from one location to another by pipes having a wide variety of shapes and configurations. For example, in the petroleum industry, a refinery conducts crude oil through the various manufacturing stages via such pipes.

In these industries, it is first the job of an engineer or designer to design the configuration of the pipes for handling the fluids. A pipe fitter then cuts and shapes the pipes to the required specifications. Since the pipes are made in relatively small sections, for ease in handling, it then becomes necessary to interconnect all of the pipes. This is done by means of pipe flanges, annular shaped members which are welded to the ends of the pipes. Each pipe flange has a plurality of pairs of holes therein which are adapted to be aligned with the pairs of holes of a second pipe flange so that the pipes can be connected together by passing bolts through the holes of adjacent pipe flanges.

It is the job of a welder to weld the pipe flanges to the ends of the pipes. The pipes are generally positioned horizontally, using suitable jacks and leveling devices, prior to attachment of the pipe flanges. When attaching a pipe flange, it is absolutely necessary that the face of the pipe flange be vertically level and that the pairs of holes be horizontally aligned. If the face of the pipe flange is not vertically level, the pipe flanges at the ends of two horizontal pipes will not be able to be connected with the two faces in exact contact. Also, if all of the pairs of holes on all of the pipe flanges are not horizontally aligned, the holes in adjacent pipe flanges will not be aligned, preventing passage of bolts therethrough.

In the past, a number of techniques have been employed to vertically level the face and/or horizontally align the pairs of holes of a pipe flange. However, heretofore, none of such devices have been convenient to use, accurate, and capable of simultaneously providing both of the required inputs to properly connect a pipe flange to the end of a length of pipe.

SUMMARY OF THE INVENTION

According to the present invention, there is provided a pipe flange aligner which solves the problems encountered heretofore. The present pipe flange aligner is a convenient and simple to use tool which is capable of accurately and simultaneously providing indications as to whether the face of a pipe flange is vertically level and whether the pairs of holes thereof are horizontally aligned. With these two inputs, a welder may readily secure a pipe flange to a pipe with the knowledge that when placed in service, the pipe flange will be readily and properly connectable to the pipe flange connected to a second pipe.

Briefly, the present pipe flange aligner comprises a pair of self-aligning line-up pins engagable with the respective holes of one of the pairs of holes in a pipe flange, the pins aligning themselves with the axes of the holes; an elongated bar extending perpendicularly through the line-up pins for interconnecting and maintaining the pins in parallel, spaced-apart relationship with the line-up pins movable relative to the bar, toward and away from each other; a first bubble level mounted on one of the line-up pins for vertically leveling the face of the pipe flange; and a second bubble level mounted on the bar for horizontally leveling the holes of the one pair of holes.

OBJECTS

It is therefore an object of the present invention to provide a pipe flange aligner.

It is a still further object of the present invention to provide apparatus for vertically leveling the face and simultaneously horizontally aligning the pairs of holes of a pipe flange.

It is a still further object of the present invention to provide a convenient and simple to use pipe flange aligner which is capable of accurately vertically leveling the face of a pipe flange while simultaneously horizontally aligning the pairs of holes thereof.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 1 is a perspective view of a section of pipe showing the manner of connecting pipe flanges thereto;

FIGS. 2 and 3 are enlarged sectional views taken along the lines 2—2 and 3—3, respectively, in FIG. 1;

DESCRIPTION OF THE PREFERRED EMBODIMENT

Figure 4:
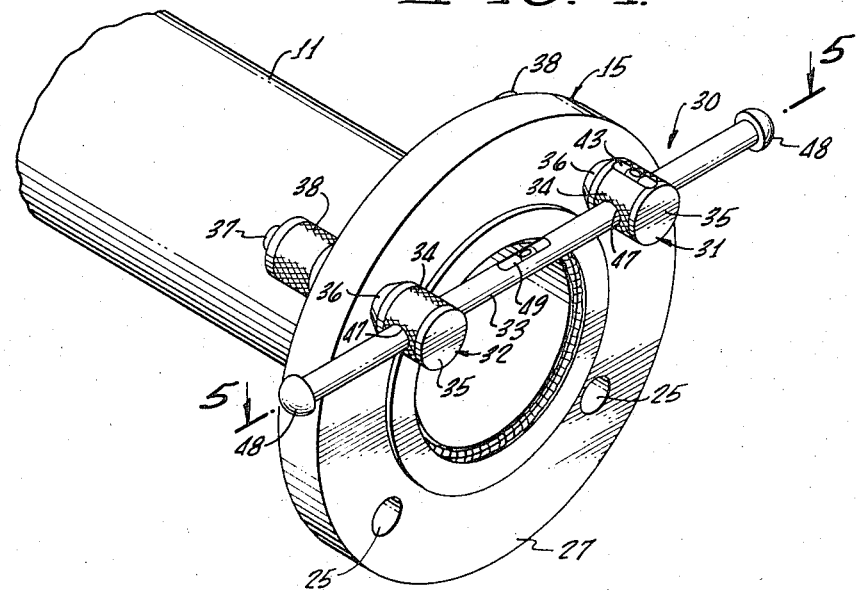
FIG. 4 is an enlarged perspective view of one of the pipe flanges of FIG. 1 showing the present pipe flange aligner in operative position relative thereto.

Referring now to the drawings and, more particularly, to FIGS. 1–3 thereof, there is shown a typical situation with which the present invention is concerned. More specifically, FIG. 1 shows a complex arrangement of pipes, generally designated 10, having four pipe ends 11–14. Pipe arrangement 10 may be designed for interconnection to four different pipes (not shown) to form a complex system for fluid handling. Pipe arrangement 10 would be made by a pipe fitter with ends 11–14 horizontal.

In order to permit connection of pipe ends 11–14 to other pipes, a pipe flange is connected to each of pipe ends 11–14 and to each of the pipes to be connected thereto. More specifically, FIG. 1 shows pipe flanges 15 and 16 already connected to pipe ends 11 and 12, respectively, and a pipe flange 17 about to be connected to pipe end 13. Pipe end 14 does not yet have a pipe flange connected thereto.

Pipe flanges 15–17 are typically constructed in one of two ways. As shown in FIG. 2, pipe flange 15 may be of the slip-on type wherein the inside diameter of pipe flange 15 is slightly larger than the outside diameter of pipe end 11 so that pipe flange 15 readily fits over pipe end 11. Once in place, pipe flange 15 is welded to pipe end 11, such as at 20 and 21.

Alternatively, and as shown in FIG. 3, pipe flange 16 may be of the butting type wherein flange 16 has an integral section 22 having the same inside and outside diameter as pipe end 12 so that section 22 readily butts against pipe end 12. Once in place, section 22 of pipe flange 16 is welded to pipe end 12, such as at 23.

As shown in FIG. 1, each of pipe flanges 15, 16, and 17 has a plurality of holes 25 therein. Holes 25 are arranged in pairs and intended to be located symmetrically on opposite sides of a vertical plane passing through the center of pipe flanges 15–17. While each of flanges 15, 16, and 17 has been shown as having four holes 25, the larger the pipe flange, the larger the number of holes, and it is common to see pipe flanges with six, eight, ten, and more holes 25.

As mentioned previously, when connecting pipe flanges 15–17 to pipe ends 11–13, respectively, it is absolutely necessary that two requirements be met. In the first instance, and considering pipe flange 15, for example, it is essential that the front face 27 of pipe flange 15 be vertically level so as to insure good surface engagement with the face of the pipe flange attached to the end of the pipe that pipe end 11 is to be connected to. In addition, it is absolutely essential that the pairs of holes 25 on all pipe flanges match up exactly so that bolts (not shown) may be passed therethrough. The accepted practice is to horizontally align the holes of each pair of holes.

Figure 5:
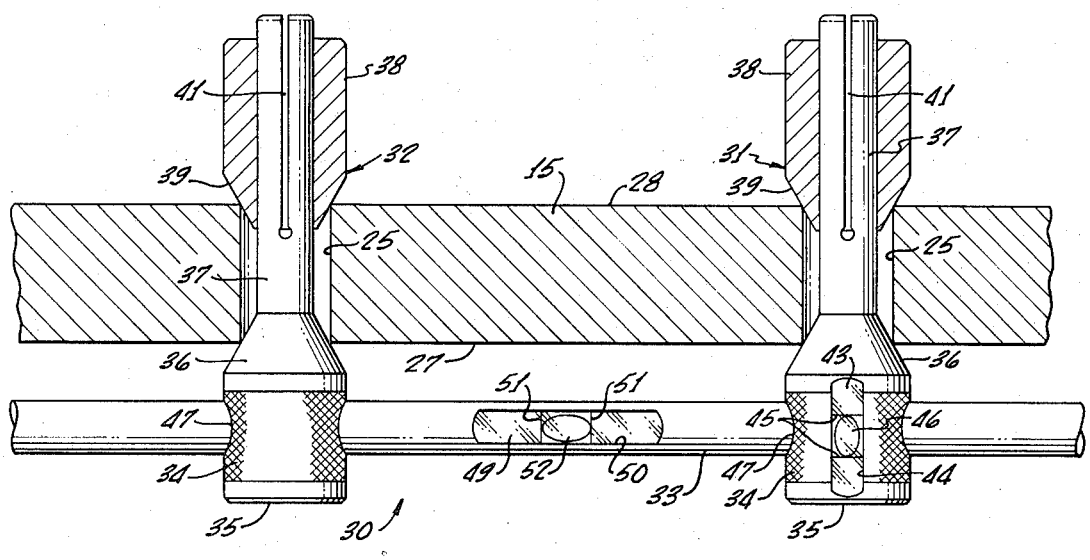
FIG. 5 is an enlarged, partial, sectional view taken along the line 5—5 in FIG. 4.

Referring now to FIGS. 4 and 5, there is shown the present pipe flange aligner, generally designated 30, for simultaneously vertically leveling face 27 and horizontally aligning the pairs of holes 25 of a pipe flange, such as flange 15. Pipe flange aligner 30 comprises a pair of self-aligning line-up pins 31 and 32 and an elongated bar 33 extending perpendicularly between the pins 31 and 32 for interconnecting and maintaining pins 31 and 32 in parallel, spaced-apart relationship. More specifically, each of line-up pins 31 and 32 comprises a cylindrical head portion 34 being enclosed at one end 35 and having a decreasing diameter conical surface 36 at the other end thereof. The length of conical surface 36 is such that the diameter of the large diameter end thereof is equal to or greater than the diameter of the largest hole 35 encountered in a pipe flange and the diameter of the small diameter end thereof is equal to or less than the diameter of the smallest hole 25 encountered in a pipe flange.

The small diameter end of conical surface 36 is connected to one end of a shaft 37 which is adapted to extend through one of holes 25 in pipe flange 15. Thus, with the dimensions of conical surface 36 of line-up pins 31 and 32 as described previously, conical surfaces 36 of pins 31 and 32 are adapted to extend partially into holes 25 in order to engage face 27 of pipe flange 15, along the circular intersections between face 27 and the entrance to holes 25.

Each of line-up pins 31 and 32 further comprises a cylindrical sleeve 38 having an inside diameter approximately equal to the outside diameter of shaft 37. Sleeve 38 has a decreasing diameter conical surface 39 at one end thereof having the same dimensions as surface 36 so that the outside configuration of sleeve 38 and surface 39 is identical to that of head portion 34 and surface 36. Thus, sleeves 38 are adapted to be positioned on shafts 37 and moved axially relative thereto until conical surfaces 39 extend partially into holes 25 in order to engage the back 28 of pipe flange 15.

As shown most clearly in FIG. 5, the preferred construction of shaft 37 is provided with an axial slit 41 which extends from a point spaced from conical surface 36 to the end of shaft 37. Slit 41 divides shaft 37 into two halves, which two halves are slightly spread apart so that the outside diameter of shaft 37 is slightly greater than the inside diameter of sleeve 38. However, when sleeve 38 slides onto shaft 37, the two halves thereof are forced together, creating a compression fit between shaft 37 and sleeve 38 so that sleeve 38 is maintained tightly in position relative to head portion 34 and shaft 37 of line-up pins 31 and 32.

Pipe flange aligner 30 further comprises first leveling means 43 mounted on one of line-up pins 31 or 32 for vertically leveling face 27 of pipe flange 15. More specifically, and as shown in FIGS. 4 and 5, first leveling means 43 may be a bubble level mounted in the cylindrical head portion 34 of line-up pin 31, the axis of bubble level 43 being parallel to the longitudinal axis of shaft 37. This may be achieved by providing a recess 44 in the top of head portion 34 of line-up pin 31, recess 44 being of a shape so as to receive the cylindrical tube of bubble level 43. Bubble level 43 would be of conventional configuration including a water filled tube having a pair of leveling marks 45 which cooperate with a bubble 46 to indicate when the axis of level 43 is exactly horizontal. This will also indicate when the axis of shaft 37 is horizontal since the two axes are parallel.

Still referring to FIGS. 4 and 5, each of line-up pins 31 and 32 has a hole 47 extending laterally through the center of cylindrical head portion 34 thereof, holes 47 being cylindrical for ease of manufacture. Holes 47 are adapted to receive bar 33 which is also cylindrical and which has an outside diameter slightly less than the diameter of holes 47. In this manner, bar 33 interconnects line-up pins 31 and 32 and maintains pins 31 and 32 in parallel, spaced-apart relationship. Bar 33 is slidable through holes 47 in line-up pins 31 and 32 so that pins 31 and 32 are movable toward and away from each other. In order to prevent separation of line-up pins 31 and 32 and bar 33, pipe flange aligner 30 includes a cap 48 connected to each end of bar 33, to prevent removal thereof from holes 47 in head portions 34 and line-up pins 31 and 32.

Pipe flange aligner 30 further comprises a second leveling means 49 mounted on bar 33 for horizontally leveling the holes 25 of each pair of holes in pipe flange 15. According to the preferred embodiment of the invention, leveling means 49 may be a bubble level mounted in a recess 50 in bar 33 with the axis of level 49 parallel to the axis of bar 33. As was the case with bubble level 43, bubble level 49 includes a water filled tube having a pair of leveling marks 51 which cooperate with a bubble 52 to indicate when the axis of level 49 is exactly horizontal. Because of the symmetry of the construction and interconnection between line-up pins 31 and 32 and bar 33, such level indication indicates when the longitudinal axes of shafts 37 are in a horizontal plane.

OPERATION

In operation, pipe flange aligner 30 may be used for vertically leveling face 27 and horizontally aligning any two pairs of holes 25 of a pipe flange, such as flange 15. To use pipe flange aligner, sleeves 38 are first removed from shafts 37. Line-up pins 31 and 32 are freely movable toward and away from each other so that shafts 37 may be inserted into the respective holes 25 of one of the pairs of holes in pipe flange 15. After shafts 37 of line-up pins 31 and 32 are so positioned, sleeves 38 are positioned over the ends of shafts 37. Sleeves 38 may be moved relative to shafts 37 by grasping head portions 34 and sleeves 38 and pushing such members towards each other.

Sleeves 38 are moved axially along shafts 37 until conical surfaces 36 and 39 are in contact with face 27 and back 28, respectively, of pipe flange 15. Because of the symmetrical construction of line-up pins 31 and 32, the longitudinal axes of shafts 37 will automatically align themselves with the axes of the holes 25 of the selected pair of holes. Since the axis of bubble level 43 is parallel to the axis of shaft 37 of line-up pin 31, bubble level 43 will indicate when shaft 37 is exactly horizontal. Furthermore, since hole 25 is perpendicular to face 27 of pipe flange 15, bubble level 43 will indicate when face 27 is in a vertical plane.

Also because of the symmetrical nature of line-up pins 31 and 32 and the fact that bar 33 intersects head portions 34 of line-up pins 31 and 32 at exactly the same points, bar 33 will be exactly parallel to a plane passing through the axes of shafts 37 of line-up pins 31 and 32. Since bubble level 49 indicates when bar 33 is horizontal, bubble level 49 will indicate when the pair of holes 25 are horizontally aligned.

With these two inputs, the welder may now weld flange 15 to pipe end 11 with the knowledge that face 27 of flange 15 is perpendicular to pipe end 11 and that the holes 25 in flange 15 are symmetrically positioned on opposite sides of a vertical plane passing through the center of flange 15. Thereafter, pipe flange aligner 30 may be removed from flange 15 by grasping sleeves 38 and head portions 34 of pins 31 and 32 and pulling, so as to remove sleeves 38 from shafts 37, thereby permitting their removal from holes 25.

It can therefore be seen that in accordance with the present invention, there is provided a pipe flange aligner 30 which solves the problems encountered heretofore. Pipe flange aligner 30 is a convenient and simple to use tool which is capable of accurately and simultaneously providing indications as to whether the face of a pipe flange is vertically level and whether the pairs of holes therein are horizontally aligned. With these two inputs, a welder may readily secure a pipe flange to a pipe with the knowledge that when placed in service, the pipe flange will be readily and properly connectable to the pipe flange connected to a second pipe.

While the invention has been described with respect to a preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. A device for vertically leveling the face and horizontally aligning the pairs of holes of a pipe flange comprising:

a pair of self-aligning line-up pins engagable with the respective holes of one of said pairs of holes in said pipe flange, said pins aligning themselves with the respective axes of said holes, each of said line-up pins comprising:

a cylindrical head portion having a lateral hole extending through the center thereof and a decreasing diameter conical surface at one end thereof, said conical surface terminating in a shaft adapted to extend through one of said holes of said one pair of holes, said conical surface extending partially into said one hole in order to engage said face of said pipe flange; and a cylindrical sleeve having a hole through its longitudinal center for engaging said shaft and having a decreasing diameter conical surface at one end thereof, said sleeve being movable axially relative to said shaft, said conical surface extending partially into said one hole in order to engage the back face of said pipe flange;

elongate bar means extending through said lateral holes in said head portions of said line-up pins for interconnecting and maintaining said pins in parallel, spaced-apart relationship, said line-up pins being movable relative to said bar means, toward and away from each other;

a first bubble level mounted in a cavity in said cylindrical head portion of one of said line-up pins, parallel to said shaft thereof, for vertically leveling said face of said pipe flange; and a second bubble level mounted in a cavity in said bar means for horizontally leveling said holes of said one pair of holes.

2. A device according to claim 1 wherein said cylindrical head portion of said one of said line-up pins has an elongate recess or cavity in the outer surface thereof, parallel to said shaft thereof, perpendicular to said lateral hole therein, and angularly spaced around the circumference of said cylindrical head portion by approximately 90° relative to said lateral hole, and wherein said first bubble level includes a liquid-filled vial positioned within said recess in said cylindrical head portion.

3. A device according to claim 2 wherein said elongate bar means has an elongate recess or cavity therein, said recess or cavity being positioned parallel to the axis thereof, and wherein said second bubble level includes a liquid-filled vial positioned within said recess in said bar means.

* * * * *